(12) United States Patent
Adragna et al.

(10) Patent No.: US 7,270,371 B2
(45) Date of Patent: Sep. 18, 2007

(54) TRUCK SLOUCH SEAT

(75) Inventors: Vincent Adragna, New Hudson, MI (US); Kyle Calvert, Sterling Heights, MI (US); James Ritter, St. Clair, MI (US); Eric Beaulieu, Farmington Hills, MI (US); Kevin Gasparotto, New Hudson, MI (US); Stephen Redwood, Detroit, MI (US)

(73) Assignee: Lear Corporation, Southfield, MI (US)

( * ) Notice: Subject to any disclaimer, the term of this patent is extended or adjusted under 35 U.S.C. 154(b) by 76 days.

(21) Appl. No.: 11/260,750

(22) Filed: Oct. 27, 2005

(65) Prior Publication Data

US 2007/0096497 A1 May 3, 2007

(51) Int. Cl.
*B60N 2/32* (2006.01)
*B60N 2/36* (2006.01)
*B60N 2/00* (2006.01)
*B60N 2/005* (2006.01)
*B60N 2/24* (2006.01)

(52) U.S. Cl. .............. 297/14; 297/16.1; 297/317; 297/318; 297/329; 297/331; 297/342; 297/343; 296/65.09; 296/65.13; 296/65.16

(58) Field of Classification Search .......... 297/14, 297/13, 16.1, 317, 318, 325, 329, 331, 340, 297/341, 342, 343; 296/65.09, 65.13, 65.16
See application file for complete search history.

(56) References Cited

U.S. PATENT DOCUMENTS 1,355,005 A * 10/1920 Schechter ............. 297/16.1
1,756,807 A * 4/1930 Black et al. ............. 297/329
2,153,155 A * 4/1939 Page et al. ............. 297/342
2,229,608 A * 1/1941 Ragsdale et al. ....... 297/317 X
2,583,372 A * 1/1952 Hall ...................... 297/14
2,725,921 A * 12/1955 Markin .................. 297/318 X
3,059,964 A * 10/1962 Makowski et al. ..... 297/331 X
3,567,280 A * 3/1971 Bradshaw ............... 297/318
3,594,037 A * 7/1971 Sherman ................. 297/14
3,632,165 A * 1/1972 Miller ................... 297/343 X
4,362,336 A * 12/1982 Zapf et al. ............. 297/317
4,452,486 A * 6/1984 Zapf et al. ............. 297/343
4,620,336 A 11/1986 Miller
4,654,905 A 4/1987 Miller
5,029,928 A * 7/1991 Huber .................... 296/63
5,112,109 A * 5/1992 Takada et al. ........... 297/343
5,498,052 A * 3/1996 Severini et al. ......... 296/65.09
5,533,305 A * 7/1996 Bielecki ................. 52/79.1
5,539,944 A 7/1996 Miller
5,671,941 A 9/1997 Girard
5,707,103 A * 1/1998 Balk .................... 297/331 X
6,089,651 A * 7/2000 Carmen ................. 297/16.1

FOREIGN PATENT DOCUMENTS

DE 4225286 A1 * 2/1994 ............ 297/318
JP 58085730 A * 5/1983 ............ 296/65.09

* cited by examiner

*Primary Examiner*—Rodney B. White
(74) *Attorney, Agent, or Firm*—Brooks Kushman P.C.

(57) ABSTRACT

A vehicle slouch seat includes a cushion frame attached to a seat back frame such that the cushion frame is pivotable from an upright position to a slouch position. The slouch seat is also foldable and stowable against a vehicle cabin wall. Motion between the upright and the slouch positions is mediated by a guide hook attached to the back side of seat back frame.

17 Claims, 4 Drawing Sheets

TRUCK SLOUCH SEAT

BACKGROUND OF THE INVENTION

1. Field of the Invention

The present invention relates to vehicle slouch seats that are positionable in a vehicle cabin, and in particular, to vehicle slouch seats that are easily folded.

2. Background Art

Strategies for efficiently using passenger cabin space in automobiles and, in particular, truck cabins are desirable. Slouch seats are a type of seat typically used in the second row in a pickup truck. Such seats provide a passenger with the ability to sit in an upright position or in a semi-reclined position.

A typical prior art design for a slouch seat includes two separate back frames, a moving frame and a fixed frame. Relative movement between these two frames occurs during positioning of the slouch set from the upright and semi-reclined position. Although this prior art design works reasonably well, utilization of two back frames increase cost and complexity. Moreover, typically such slouch seats do not fold up and stow away.

Accordingly, there is a need for a slouch seat design that is less complex while being both foldable and stowable.

SUMMARY OF THE INVENTION

The present invention overcomes the problems of the prior art by providing in one embodiment a slouch seat that in one variation is useful in a truck. The slouch seat of this embodiment includes a single cushion frame attached to a seat back frame such that the cushion frame is pivotable from an unfolded position to a folded position. Motion between these two positions is mediated by a guide hook attached to the back side of the seat back frame. The guide hook is adapted to receive a guide bar attached to a passenger cabin wall such that the guide bar guides the motion of the guide hook when the slouch seat is repositioned. An attachment bracket attaches the slouch seat of this embodiment to the vehicle passenger cabin. Advantageously and in contract to prior art slouch seats, the seat back frame of a variation of the invention does not include two separate back frames. Instead, the slouch seat includes a single moveable back frame. This simplified design is easier and less costly to fabricate.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

Figure 1:
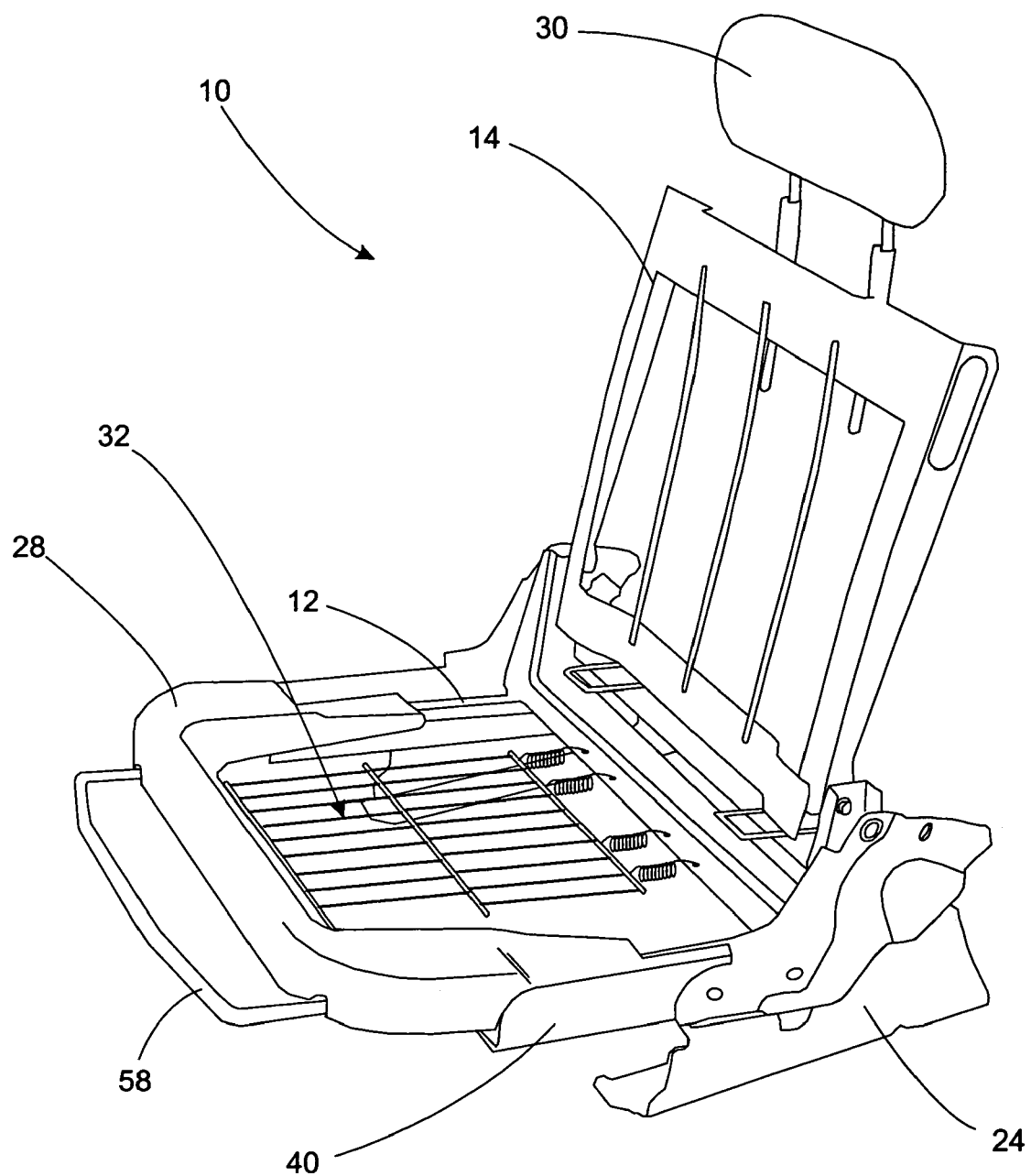
FIG. 1 is a perspective view of an embodiment of the slouch seat of the present invention.
Figure 2A:
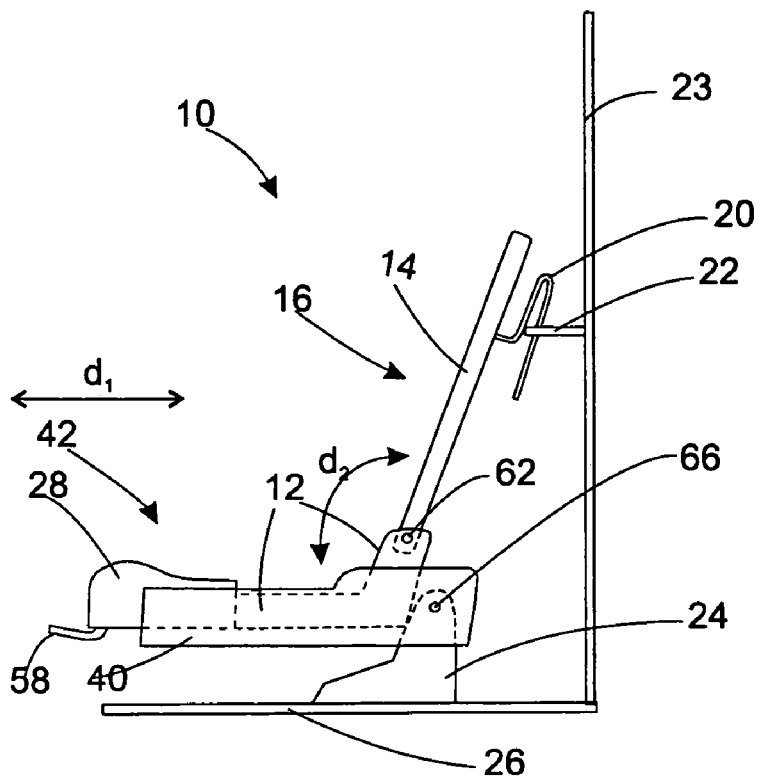
FIG. 2A is a side view of an embodiment of the slouch seat of the present invention at an upright position.
Figure 2B:
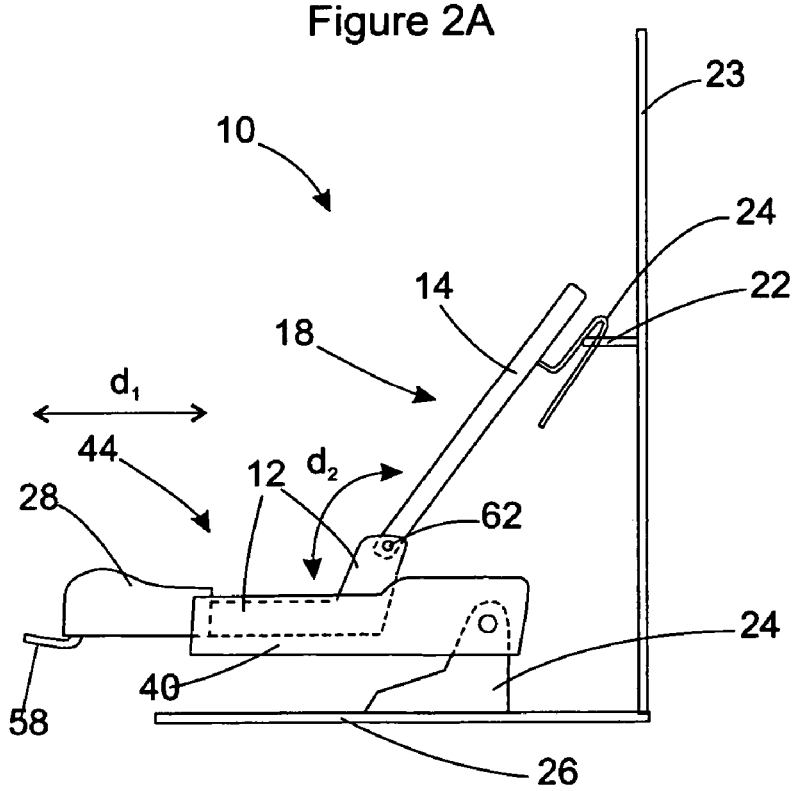
FIG. 2B is a side view of an embodiment of the slouch seat of the present invention at a slouch position.

With reference to FIGS. 1, 2A, and 2B, an embodiment of the slouch seat of the present invention is illustrated. FIG. 1 is a perspective view of the vehicle slouch seat. FIG. 2A is a side view of the vehicle slouch seat at an upright position. FIG. 2B is a side view of the slouch seat in a slouch position. Slouch seat 10 includes cushion frame 12 attached to seat back frame 14. Seat back frame 14 is attached to cushion frame 12 such that seat back frame 14 is pivotable from upright position 16 to slouch position 18 or from slouch position 18 to upright position 16. As used herein, "upright position" means that slouch seat is in a position that tends to cause a passenger sitting in the seat to be seated in an upright position. As used herein "slouch position" means a position that tens to cause a passenger sitting in the seat to be in a partially reclined position with their back lying more backwards than a person in an upright position. Guide hook 20 is attached to seat back frame 14. In a variation, this attachment is on the backside of seat back frame 14. Guide hook 20 is adapted to receive guide bar 22 attached to passenger cabin wall 23 such that the guide bar guides the motion of the guide hook 20 when the slouch seat is moved from upright position 16 to slouch position 18, or from slouch position 18 to upright position 16. This directing of guide hook 20 is accomplished by guide bar 22 sliding relative to guide hook 20. Movement between upright position 16 and slouch position 18 involves motion in direction $d_1$. Attachment bracket 24 is used to attach slouch seat 10 to vehicle passenger cabin floor 26. Slouch seat 10 also includes anti-submarine frame 28 and head rest 30. Spring network 32 partially provides the cushioning effect present in any vehicle seat. Finally, slouch seat 10 typically includes cushioning and upholstery for both comport and aesthetic appeal.

Figure 3:
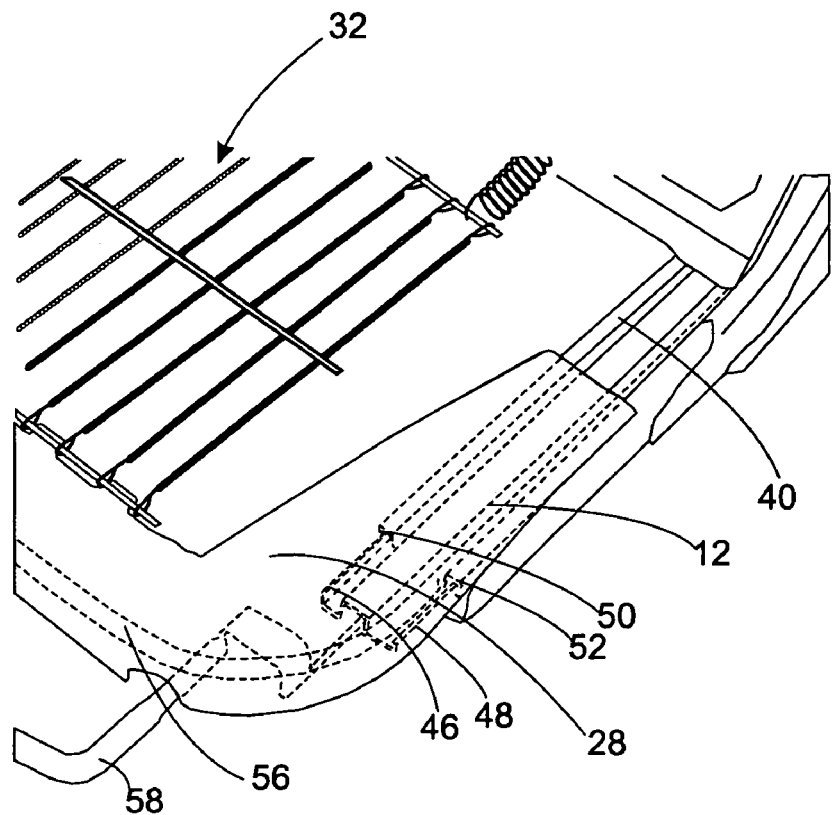
FIG. 3 is a perspective view detailing attachment of a cushion frame to a track support.

With reference to FIGS. 2A, 2B, and 3, a variation of the moveable attachment of the slouch seat to bracket 22 is illustrated. FIG. 3 is a perspective view detailing the attachment of cushion frame 12 to a track support. Slouch seat 10 further includes track support 40 which is slidably attached to cushion frame 12 such that when the slouch seat is at upright position 16, cushion frame 12 is at non-extended position 42 relative to track support 40 and when slouch seat 40 is at slouch position 18, cushion frame 12 is at extended position 44. The movement of track support 40 is directed by movement of sides 46, 48 of cushion frame 12 in tracks 50, 52 of track support 40. Slouch seat 10 further includes lift towel bar 56 that allows a vehicle passenger to unlock cushion frame 12 by lifting handle 58 to allow sliding of cushion frame 12 within track support 40. This allows positioning of cushion frame 12 between non-extended position 42 and extended position 44. The necessary motion for movement between upright position 16 and slouch position 18 is also provided by the pivotable attachment of cushion frame 12 to seat back frame 14 at a first pivot position centered about axle 62. This attachment allows for a pivoting motion about axle 62 along direction $d_2$ when the seat is moved from upright position 16 to slouch position 18 and visa versa.

Figure 4:
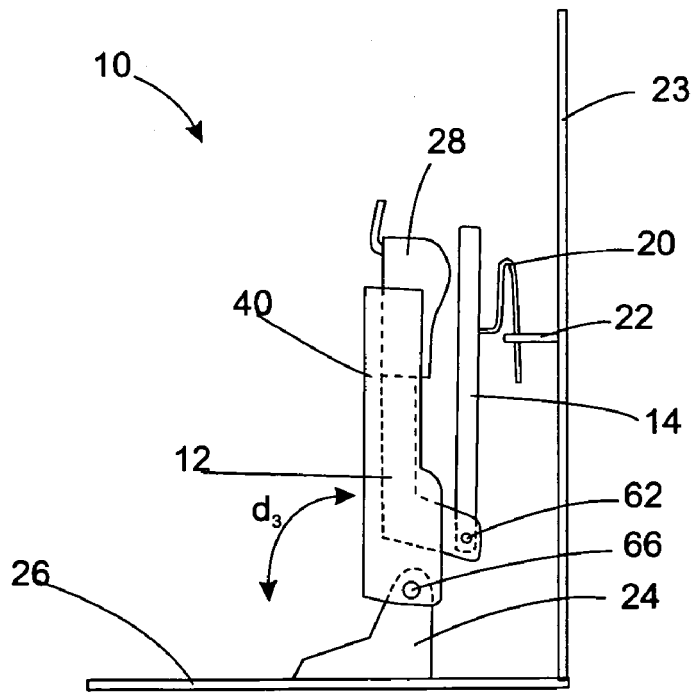
FIG. 4 is a side view of an embodiment of the slouch seat at the folded position.

With reference to FIG. 4, a variation of the present invention in which slouch seat 10 is positionable in a folded configuration is provided. In this variation, track support (and therefore cushion frame 12) is pivotably attached to attachment bracket 24 at a second pivot position about axle 66. Motion about direction $d_3$ about axle 66 allows slouch seat 10 to be folded. Folding is best accomplished when cushion frame 12 is at non-extended position 42. In a similar fashion as set forth above, guide hook 20 and guide bar 22 guide the motion of slouch seat 10 during positioning from the unfolded and folded configurations. Specifically, guide hook 20 and guide bar 22 guides and stabilizes the motion of seat back frame 14 which is attached to track support 40 which is in communication with cushion frame 12. In a further refinement, slouch seat 10 of this variation is also stowable when folded against vehicle cabin wall 23.

Figure 5A:
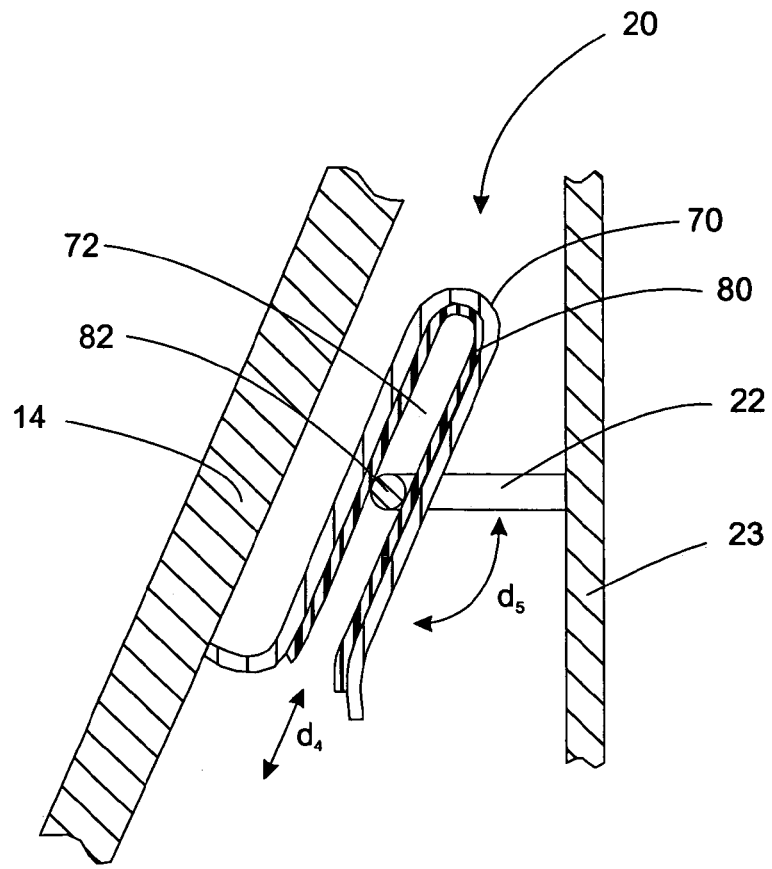
FIG. 5A is a cross-sectional view showing positioning of the guide hook relative to the guide bar.
Figure 5B:
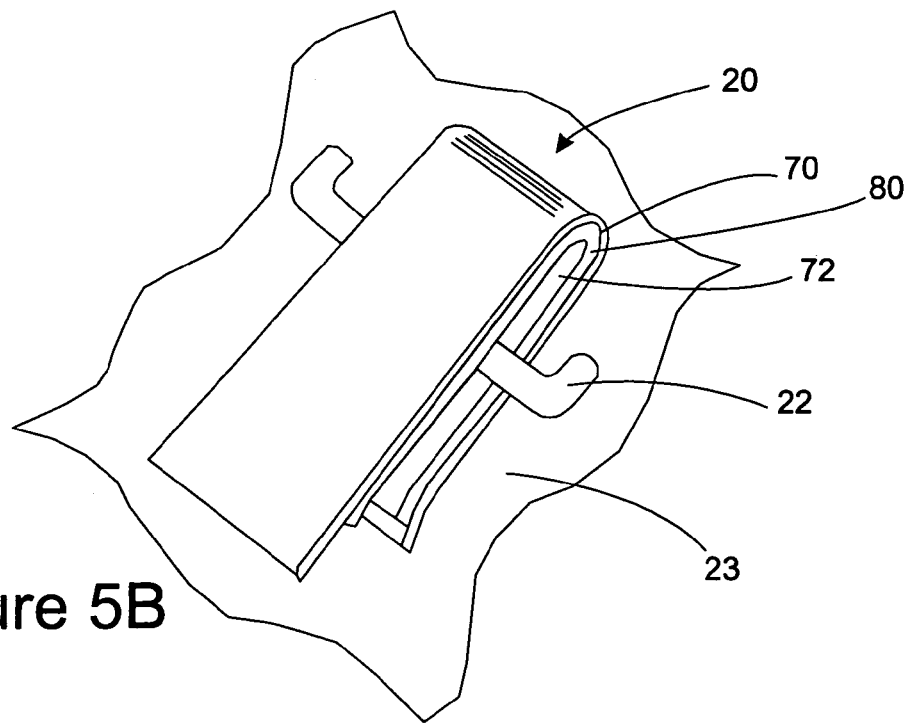
FIG. 5B is a perspective view showing the positioning of the guide hook relative to the guide bar.

With reference to FIGS. 5A and 5B, details of the guide hook and the guide bar are provided. FIG. 5A is a cross-sectional view showing positioning of the guide hook relative to the guide bar. FIG. 5B is a perspective view showing the positioning of the guide hook relative to the guide bar. Guide hook 20 includes folded sheet 70 which defines slot 72 within which guide bar 22 moves (i.e., guide bar 22 slides therein). In cross-section, slot 72 is typically U-shaped or J-shaped. Folded sheet 70 is made from any material sufficiently rigid and strong to withstand the force present when the slouch seat is moved between upright position 16 and slouch position 18. Examples of materials that folded sheet 70 can be made from include plastics, reinforced plastics, and metal. Folded metal sheets are particularly useful. Guide bar 22 is attached to vehicle cabin wall 23. This attachment is typically rigid and stationary relative to vehicle cabin wall 23. Therefore, examples of suitable material for forming guide bar 22 include plastics, reinforced plastics, and metal. Metals are particularly useful for this purpose.

Still referring to FIGS. 5A and 5B, when folded sheet 70 and guide bar 22 are both made from metal, there is a tendency for undesirable noise to be generated by contacting of these components. Such noise is particularly noticeable during movement of slouch seat 10 between upright position 16 and slouch position 18 and between the folded and unfolded positions. Inclusion of plastic insert 80 within slot 72 dampens the contact and friction between guide hook 20 and guide bar 22 thereby minimizing such noise. Finally, in moving from upright position 16 to slouch position 18 or from the unfolded to the folded configurations, guide bar 22 moves along direction $d_4$ while at least partially rotating along direction $d_5$ about central portion 82 of guide bar 22.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle slouch seat positionable at an upright position and a slouch position, the slouch seat comprising:
   a cushion frame;
   a seat back frame attached to the cushion frame such that the cushion frame is pivotable from the upright position to the slouch position or from the slouch position to the upright position;
   a guide hook attached to the seat back frame adapted to receive a guide bar attached to a passenger cabin wall such that the guide bar guides the motion of the guide hook when the slouch seat is moved from the upright position to the slouch position or from the slouch position to the upright position by the guide bar sliding within the guide hook; and
   an attachment bracket for moveably attaching the cushion frame to the vehicle passenger cabin; and
   a track support wherein the cushion frame is slidably attached to the track support such that when the slouch seat is at the slouch position, the cushion frame is at an extended position relative to the track support and when the slouch seat is at the upright position, the cushion frame is at a non-extended position, wherein the track support is pivotably attached to the attachment bracket at a second pivot position.

2. The slouch seat of claim 1 further comprising a lift towel bar that allows positioning between the extended and non-extended positions.

3. The slouch seat of claim 1 wherein the cushion frame is pivotably attached to the seat back frame at a first pivot position.

4. The slouch seat of claim 1 wherein the slouch chair is movable between an unfolded and a folded configuration by pivoting about the second pivot position.

5. The slouch seat of claim 4 wherein the folded sheet is a metal folded sheet.

6. The slouch seat of claim 1 wherein the guide hook comprises a folded sheet defining a slot within which the guide bar moves.

7. The slouch seat of claim 6 further comprises a plastic insert attached to the guide hook within the slot.

8. The slouch seat of claim 1 wherein the seat back frame is a single frame.

9. The slouch seat of claim 1 further comprising upholstery covering the cushion frame and the seat back frame.

10. A vehicle slouch seat positionable at an upright position and at a slouch position, the slouch seat comprising:
    a seat back frame;
    a track support;
    a cushion frame slidably attached to the track support and pivotably attached to the seat back frame such that when the slouch seat is at the upright position, the cushion frame is at an extended position relative to the track support and when the slouch seat is at the slouch position, the cushion frame is at a non-extended position;
    a guide hook attached to the seat back frame adapted to receive a guide bar attached to a passenger cabin wall such that the guide bar guides the motion of the guide hook when the slouch seat is moved from the upright position to the slouch position or from the slouch position to the upright position by the guide bar sliding within the guide hook; and
    an attachment bracket for moveably attaching the cushion frame to the vehicle passenger cabin wherein the track support is pivotably attached to the attachment bracket at a second pivot position.

11. The slouch seat of claim 10 further comprising a lift towel bar that allows positioning between the extended and non-extended positions.

12. The slouch seat of claim 10 wherein the slouch chair is movable between an unfolded and a folded configuration by pivoting about the second pivot position.

13. The slouch seat of claim 10 wherein the guide hook comprises a folded sheet defining a slot within which the guide bar moves.

14. The slouch seat of claim 13 wherein the folded sheet is a metal folded sheet.

15. The slouch seat of claim 14 further comprises a plastic insert attached to the guide hook within the slot.

16. The slouch seat of claim 10 wherein the seat back frame is a single frame.

17. A vehicle slouch seat positionable at an upright position and at a slouch position, the slouch seat comprising:
   a seat back frame;
   a track support;
   a cushion frame slidably attached to the track support and pivotably attached to the seat back frame such that when the slouch seat is at the upright position, the cushion frame is at an extended position relative to the track support and when the slouch seat is at the slouch position, the cushion frame is at a non-extended position;
   a guide hook attached to the seat back frame adapted to receive a guide bar attached to a passenger cabin wall such that the guide bar guides the motion of the guide hook when the slouch seat is moved from the upright position to the slouch position or from the slouch position to the upright position by the guide bar sliding within the guide hook;
   a plastic insert positioned within the guide hook for dampening contact between the guide hook and the guide bar; and
   an attachment bracket for moveably attaching the cushion frame to the vehicle passenger cabin.

* * * * *